United States Patent [19]

Iwama

[11] Patent Number: 5,107,702
[45] Date of Patent: Apr. 28, 1992

[54] APPARATUS FOR AUTOMATICALLY ADJUSTING RIM WIDTH OF TIRE UNIFORMITY MACHINE

[75] Inventor: Atsuaki Iwama, Kobe, Japan

[73] Assignee: Kabushiki Kaisha Kobe Seiko Sho, Kobe, Japan

[21] Appl. No.: 619,491

[22] Filed: Nov. 29, 1990

[30] Foreign Application Priority Data

Dec. 18, 1989 [JP] Japan .................. 1-328688

[51] Int. Cl.$^5$ ............................... G01N 17/02
[52] U.S. Cl. ............................ 73/146; 73/8; 73/9
[58] Field of Search ................... 73/146, 9, 8

[56] References Cited

U.S. PATENT DOCUMENTS 4,380,927  4/1983  Oda et al. .................. 73/146

Primary Examiner—Donald O. Woodiel
Attorney, Agent, or Firm—Oblon, Spivak, McClelland, Maier & Neustadt

[57] ABSTRACT

An apparatus for automatically adjusting the rim width between upper and lower rims on a tire uniformity machine of the type includes an upper spindle rotatable about the axis thereof, a lower spindle located opposingly in vertical alignment with the upper spindle, the lower spindle being rotatable about the axis thereof and movable in the axial direction, and upper and lower rims detachably mounted coaxially on opposing end portions of the upper and lower spindles, respectively, to release grip therebetween a testing tire to be rotated and held in contact with a load wheel for inspection of uniformity. The rim width adjusting apparatus includes a ring-like adapter threaded on a lower end portion of the upper spindle and vertically movably supporting the upper rim on the upper spindle; and a rotation blocking device mounted on a bearing housing over the adapter for blocking rotation of the adapter relative to the upper spindle.

7 Claims, 6 Drawing Sheets 5,107,702

APPARATUS FOR AUTOMATICALLY ADJUSTING RIM WIDTH OF TIRE UNIFORMITY MACHINE

BACKGROUND OF THE INVENTION

1. Field of the Invention

This invention relates to a tire uniformity machine which serves to inspect accuracy in uniformity of various tires, and more particularly to an apparatus for automatically adjusting the rim width, namely, the width of the space between upper and lower rims which detachably grip therebetween a tire to be tested on a tire uniformity machine.

2. Description of the Prior Art

Generally, as exemplified in FIG. 8, a tire uniformity machine of this sort is arranged to grip a testing tire T releasably between upper and lower rims TR and BR for rotation about its axis and to bring the rotating tire T into contact with a load wheel LW which serves as a substitute road surface, inspecting the accuracy in uniformity of the tire T through upper and lower load cells LC-T and LC-B. The width of the interval between the upper and lower rims TR and BR needs to be adjusted according to the size of the testing tire T to be loaded on the machine.

In this regard, there has been known in the art a rim width adjusting mechanism as exemplified in FIG. 9 (Japanese Utility Model Publication 62-2520).

In FIG. 9, indicated at 51 is an upper spindle which is rotatably supported on a machine frame 52 through bearings. An upper rim 54 is replaceably mounted on the lower end of the upper spindle 51 through a hub 53. Provided opposingly to and in vertical alignment with the upper spindle 51 is a lower spindle 55 which is movable in the axial direction and at the same time rotatable about its axis. A lower rim 56 is coaxially mounted on the upper end of the lower spindle 55. Further, a chuck male adapter 58 is provided centrally on the upper end of the lower spindle 55, the chuck male adapter 58 having a male taper portion 57 in coaxial relation with the lower spindle 55. The afore-mentioned hub 53 is provided with a taper hole 59 centrally on its lower side in concentric relation with the upper spindle 51, for fitting engagement with the male taper portion 57 of the chuck male adapter 58.

The width of the interval between the upper and lower rims can be altered by replacing the chuck male adapter 58 by a spare adapter of the height corresponding to the type and size of the tire T to be tested.

Namely, in case of the above-described prior art apparatus, the operator is required to replace the chuck male adapter manually every time when changing the tire size, stopping the operation of the uniformity machine for a long period of time despite deteriorations in efficiency. Besides, there have to be provided a large number of spare chuck male adapters 58 to cover the whole range of the rim width which is normally varied at a step of 0.5 inch, requiring a large space and a lot of efforts for storage.

SUMMARY OF THE INVENTION

In view of the foregoing situations, the present invention has as its object the provision of an apparatus for automatically adjusting the rim width on a tire uniformity machine, which is capable of automatically adjusting the rim width according to the size of testing tires without necessitating to store a large number of replacement parts, while shortening the time of machine stoppage for the rim width adjustment to attain improved operational efficiency and cost reduction.

In accordance with the present invention, there is provided an apparatus for automatically adjusting the rim width between upper and lower rims on a tire uniformity machine of the type including an upper spindle rotatable about the axis thereof, a lower spindle located opposingly in vertical alignment with the upper spindle, the lower spindle being rotatable about the axis thereof and movable in the axial direction, and upper and lower rims detachably mounted coaxially on opposing end portions of the upper and lower spindles, respectively, to releasably grip therebetween a testing tire to be rotated and held in contact with a load wheel for inspection of uniformity, characterized in that the rim width adjusting apparatus comprises: a ring-like adapter threaded on a lower end portion of the upper spindle and vertically movably supporting the upper rim on the upper spindle; and a rotation blocking means mounted on a bearing housing over the adapter for blocking rotation of the adapter relative to the upper spindle.

Preferably, the bearing housing is vertically movably mounted on a machine frame, and a bearing housing drive and lock means is provided on the machine frame to bring the center of the testing tire into alignment with the center of the load wheel.

The adapter may be internally provided with an adapter lock means which is arranged to fix the adapter pressingly and releasably to the upper spindle.

According to the present invention, in order to adjust the rim width W between the upper and lower rims, the upper spindle is rotated while blocking rotation of the adapter and permitting only vertical movements relative to the bearing housing, thereby moving the adapter in the vertical direction relative to the upper spindle to shift the position of the upper rim on the upper spindle in the axial direction toward or away from the lower rim. Upon completion of the rim width adjustment, the adapter is relieved of the action of the rotation blocking means. For prohibiting the vertical movement of the adapter relative to the upper spindle (i.e., except when adjusting the rim width), the adapter is pressingly fixed to the upper spindle by the adapter lock means to prevent its movements relative to the upper spindle. The lock means is released at the time of adjustment of the rim width to permit axial movements of the adapter.

The bearing housing of the upper spindle is shifted axially by the drive and lock means to align the center of the interval between the upper and lower rims, namely, the center of the testing tire with the center of the load wheel, and then the bearing housing is fixed to the machine frame again by applying the lock means, permitting to test the tire under optimum conditions.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Figure 1:
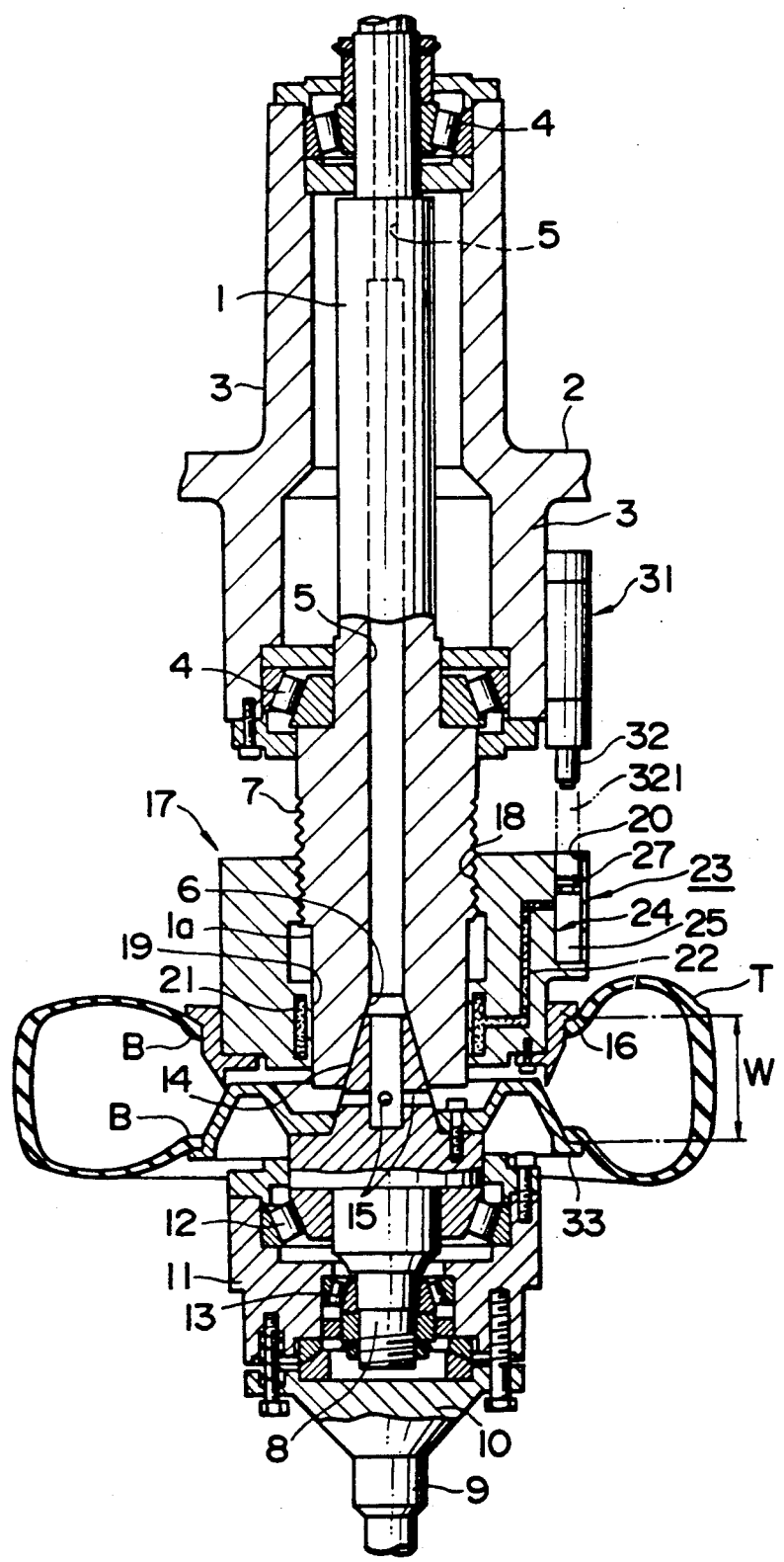
FIG. 1 is a vertical sectional view through the center of a rim width adjusting apparatus embodying the present invention.

Hereafter, the invention is described more particularly by way of the preferred embodiments shown in the drawings.

Referring to FIGS. 1 through 5, there are shown major components of an automatic rim width adjusting apparatus according to the invention, including an upper spindle 1 which is rotatably supported in a vertical tubular bearing housing 3 through bearings 4, the upper spindle 1 being provided with an air passage axially therethrough and a concentric taper hole 6 at the lower end thereof. Except a distal lower end portion 1a, a screw thread is formed on the circumference of the lower end portion of the upper spindle 1.

The reference numeral 8 denotes a lower spindle which is rotatably journalled through bearings 12 and 13 in a bearing housing 11 which is mounted through an adapter 10 on the distal end of piston rod 9 of a hydraulic cylinder which is mounted on the machine frame 2 although not shown in the drawings. The lower spindle 8 is disposed opposingly to and coaxially in alignment with the upper spindle 1, and moved up and down in the axial direction by the piston rod 9 of the above-mentioned hydraulic cylinder.

The upper end of the lower spindle 8 is formed in the shape of a concentric male taper 14 of truncated conical shape to be fittingly engaged with the taper hole 6 in the upper spindle 1, and provided with an air passage 15 leading from its top end face to the circumferential surface of the male taper 14.

Indicated at 16 is an upper rim which is detachably and fixedly fitted on the circumference of a lower end portion of an adapter 17 of ring-like shape. The adapter 17 is provided with a female screw 18 in an upper portion of its inner periphery, and a sliding wall portion 19 in a lower portion in fitting engagement with the lower end portion 1a of the upper spindle 1. The female screw 18 is rotatably meshed with the screw portion 7 on the upper spindle 1. The adapter 17 has a rotation blocking hole 20 formed thereinto from its top side, and an annular hydraulic lock chamber 21 formed around the sliding wall portion 19 for pressing the adapter fixedly and releasably to the upper spindle 1. Part of the sliding wall portion 19 is reduced in thickness and deformable in the radial direction. The hydraulic lock chamber 21 and rotation blocking hole 20 are communicated with each other through an oil passage 22.

Figure 2:
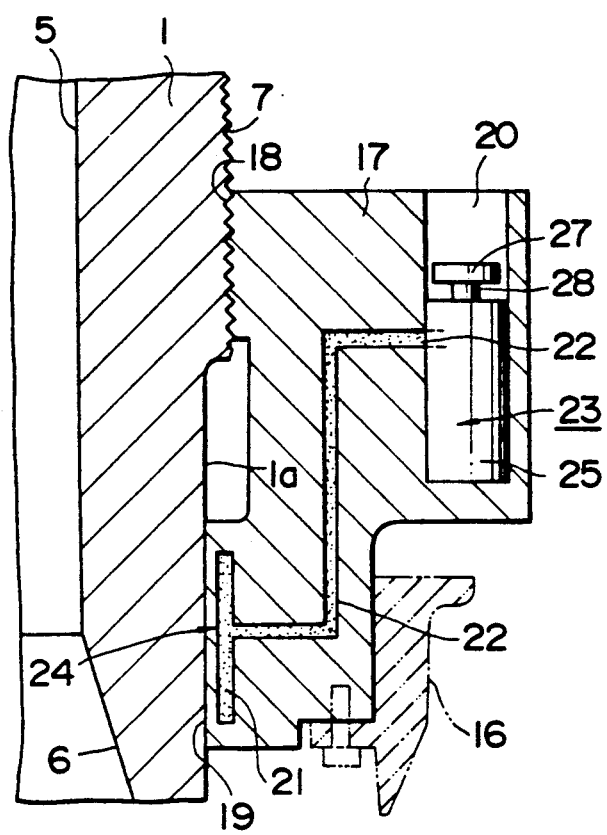
FIG. 2 is an enlarged sectional view of an adapter lock means.
Figure 3:
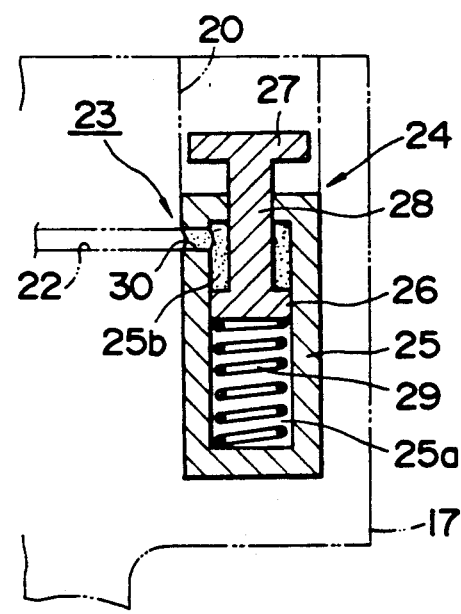
FIG. 3 is an enlarged vertical section of a hydraulic cylinder serving as a lock means.

As shown particularly in FIG. 2, the adapter lock means 23 is of a hydraulic type which is constituted by the hydraulic lock chamber 21, oil passage 22, and hydraulic cylinder unit 24 fitted in the rotation blocking hole 20. The hydraulic cylinder unit 24 includes, as shown in FIG. 3, a cylinder 25, a piston rod 28 having a piston 26 and a depressible unlocking member 27 at the lower and upper ends thereof, and a spring 29 fitted in a lower chamber 25a of the cylinder 25. An oil hole 30 which is provided in the side wall of an upper chamber 25b is communicated with the above-mentioned oil passage 22. Accordingly, by the action of the spring 29, a locking pressure is produced in the hydraulic lock chamber 21 on the side of the sliding wall portion 19 (on the side of the inner periphery) to press part of the sliding wall portion 19 radially inward to grip the lower end portion 1a fixedly. Upon depressing the unlocking member 27 against the action of the spring 29, the pressure in the hydraulic lock chamber 21 is dropped to zero level to release the lock.

Indicated at 31 is an adapter rotation blocking means which is, in this particular embodiment shown, an air cylinder with a locking rod 32 which is retractably extended downward, the air cylinder being positioned on the circumferential surface of the bearing housing 3 in parallel relation with the axis thereof and immediately above the rotation blocking hole 20 concentrically in vertical alignment therewith. As soon as the locking rod 32 is inserted into the rotation blocking hole 20, the lock releasing member 27 is pushed down to release the lock of the adapter 17 and upper spindle 1. The adapter 17 is blocked against rotation by insertion of the locking rod 32 into the rotation blocking hole 20 but it can be moved axially in the upward or downward direction upon rotating the upper spindle 1.

Designated at 33 is a lower rim which is detachably mounted on the circumference of a base portion of the male taper 14 on the lower spindle 8, in face to face relation with the upper rim 16.

A testing tire T is placed on the lower rim 33 on the lower spindle 8 which is in a lowered position. After fitting a bead portion B on the lower rim 33, the lower spindle 8 is elevated to bring the male taper 14 of the lower spindle 8 into fitting engagement with the taper hole 6 of the upper spindle 1, simultaneously fitting the other or upper bead portion B on the upper rim 16 to grip the tire T between the upper and lower rims 16 and 33.

Compressed air is introduced into the the tire T, which has been gripped between the upper and lower rims 16 and 33 in the above-described manner, through the axial air passage 5 in the upper spindle 1, and the upper spindle 1 is driven to rotate the rim assembly therewith while holding the tire in contact with the load wheel LW to inspect the tire uniformity.

Upon completing the tire examination, the compressed air in the tire T is discharged, and the tire T is lowered by a downward movement of the spindle 8 to disengage from the upper rim 16 and then placed on a transfer conveyer (not shown) for transfer to a next stage. In the meantime, a fresh testing tire T is loaded on the lower spindle 8 and set in position to undergo the uniformity examination in the same manner as described above.

Figure 4:
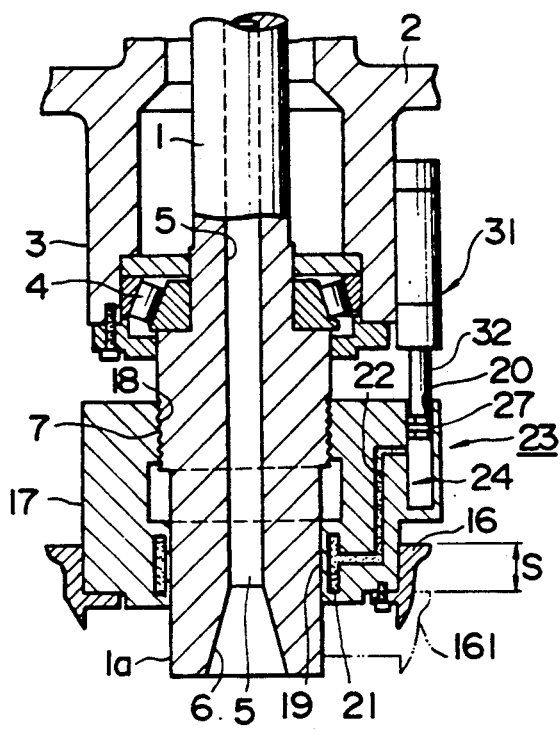
FIGS. 4 and 5 are sectional views explanatory of a rim width adjusting operation.
Figure 5:
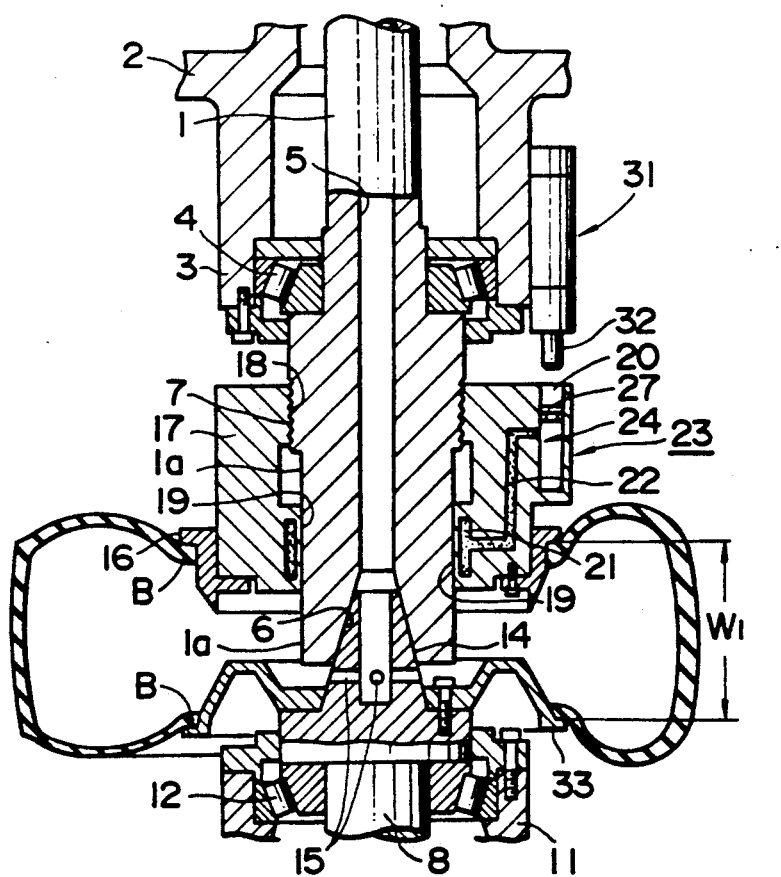

In this first embodiment, for changing the rim width W to cope with an alteration of tire size, the lower spindle 8 is lowered from the position shown in FIG. 1 to remove the tire T from the upper rim 16, and then the rotational angle of the upper spindle 1 is detected by a sensor such as rotary encoder (not shown) or the like to turn the upper spindle 1 until the rotation blocking hole 20 of the adapter 17 is located immediately below and coaxially in alignment with the locking rod 32. In this state, the adapter rotation blocking means 31 is actuated, extending the rod 32 downwardly into the rotation blocking hole 20 (as indicated by two-dot chain line in FIG. 1) to block rotation of the adapter 17. At this time, the lock rod 32 pushes down the depressible unlocking member 27 against the action of the spring 29 to drop the pressure in the hydraulic lock chamber 21 to zero level, releasing the sliding wall portion 19 of the adapter 17 from the constricted state to permit relative rotational movements between the sliding wall portion 19 and the lower end 1a of the upper spindle 1. In the next place, an axial displacement S of the upper rim 16 which corresponds to the new rim width $W_1$ (see FIG. 4) is determined by a spindle drive control unit (not shown), and the upper spindle 1 is rotated by a required number of turns without rotating the adapter 17, whereupon the upper spindle 1 is displaced in the axial direction by a distance S as shown in FIG. 4, from the position indicated by two-dot chain line 161 to the position indicated by solid line. In the meantime, the lock rod 32 continuedly pushes down the depressible unlocking member 27 under an appropriate pressure of the air cylinder 32 of the adapter rotation blocking means 31. Upon finishing the displacement of the upper rim 16 in this manner, the lock rod 32 is retracted upward to disengage from the depressible unlocking member 27. As a result, the piston rod 28 is returned to the upper position by the spring 29, so that the pressure in the hydraulic lock chamber 21 is increased to a high level, fixedly pressing part of the sliding wall portion 19 of the adapter 17 against the lower end portion 1a of the upper spindle 1 and thus completing the operation of altering the rim width. Now, the testing tire T is held on the lower rim 33 on the lower spindle 8, followed by the upward movement of the lower spindle 8 to fit the upper bead B of the tire T in the upper rim 16 while engaging the male taper 14 of the lower spindle 8 with the taper hole 6 of the upper spindle 1 to hold the tire T at the rim width $W_1$ as shown in FIG. 5.

According to the above-described first embodiment of the invention, the adapter 17 can be automatically fixed to the upper spindle 1 securely in a tightly pressed state, maintaining the upper rim 16 on the adapter 17 fixedly in an adjusted position relative to the upper spindle 1 with an accurate rim width. Further, the adapter lock means 23 can be released automatically by the adapter rotation blocking means 31 when necessary.

Figure 6:
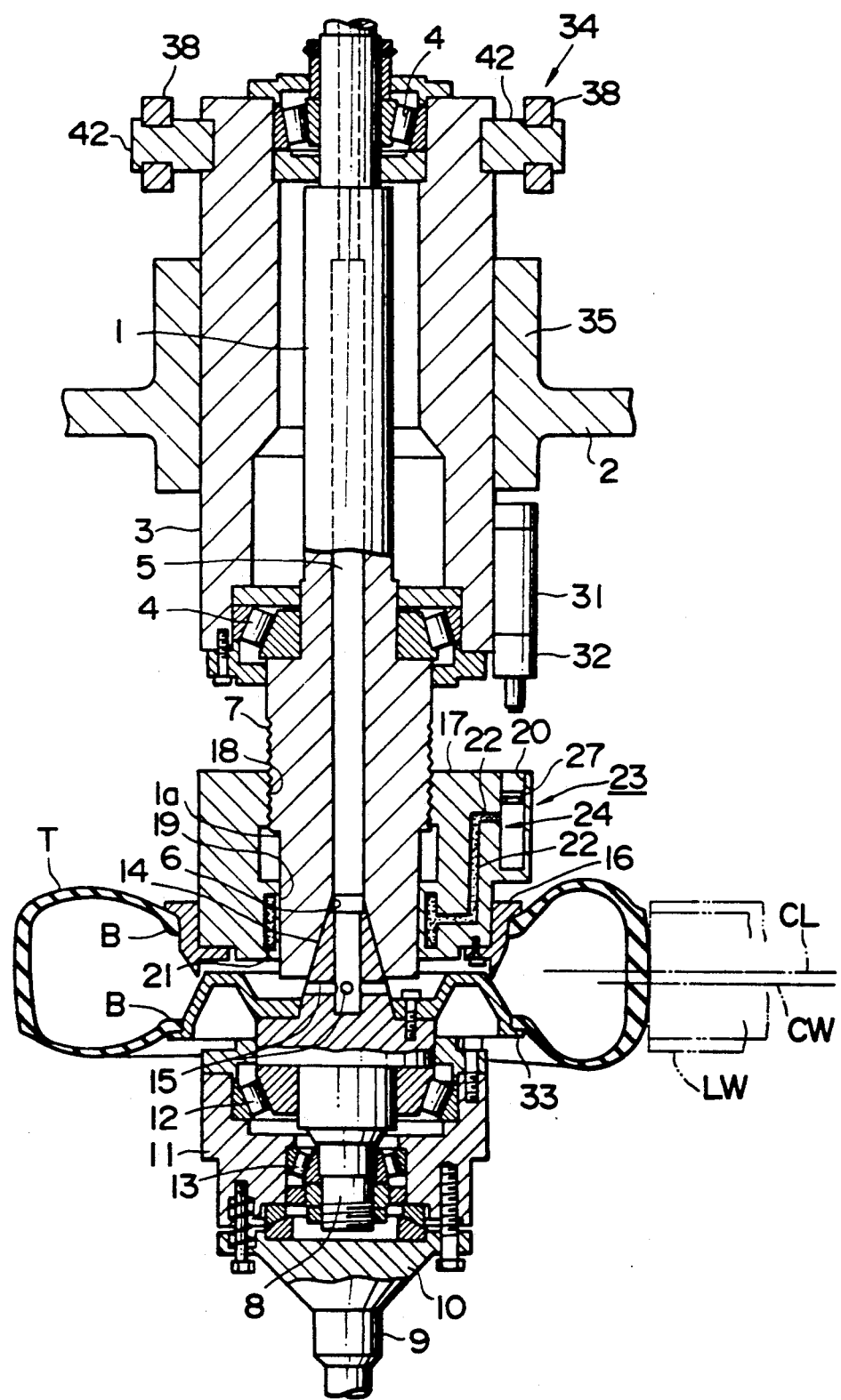
FIG. 6 is a view similar to FIG. 1 but showing another embodiment of the invention.
Figure 6:
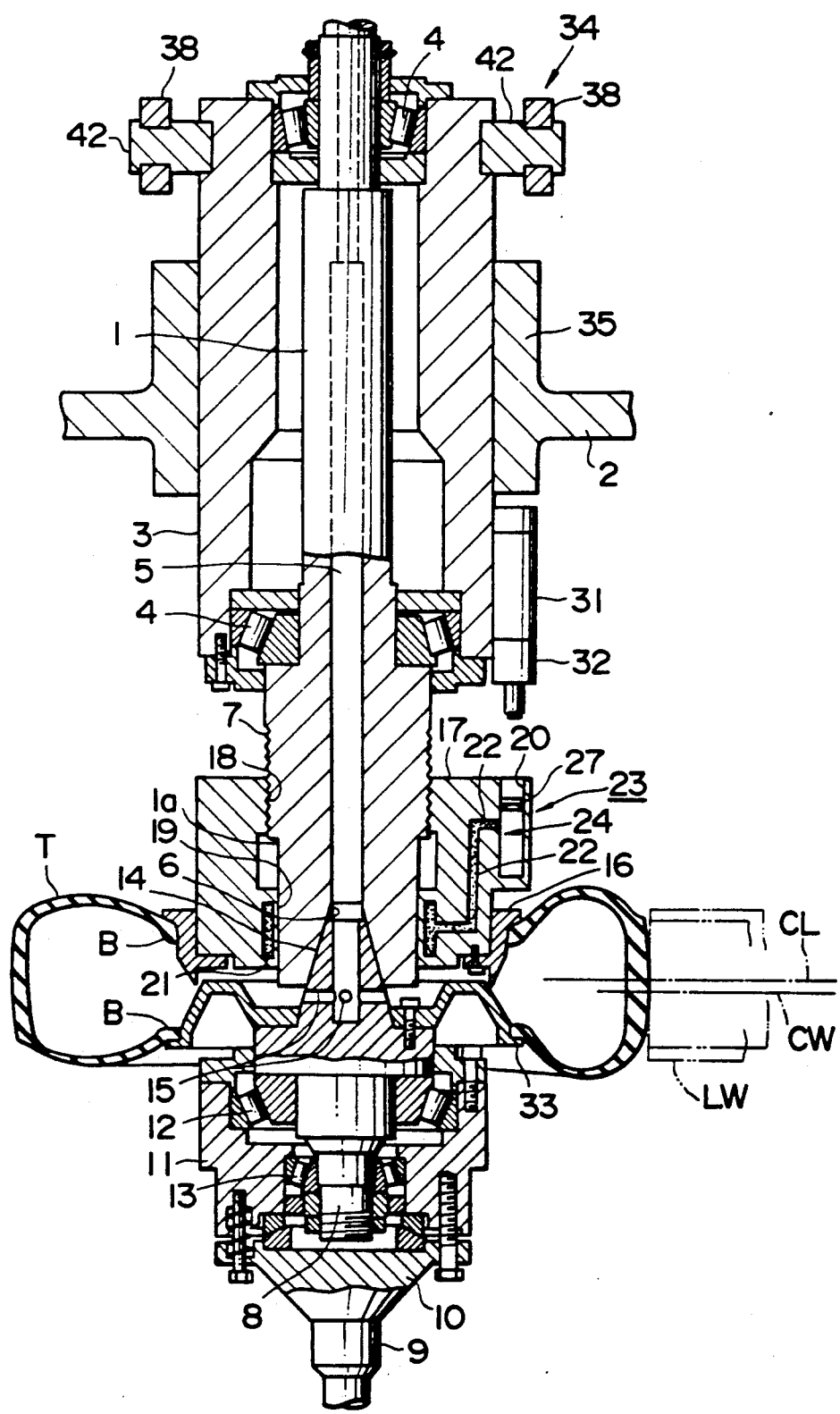
Figure 9:
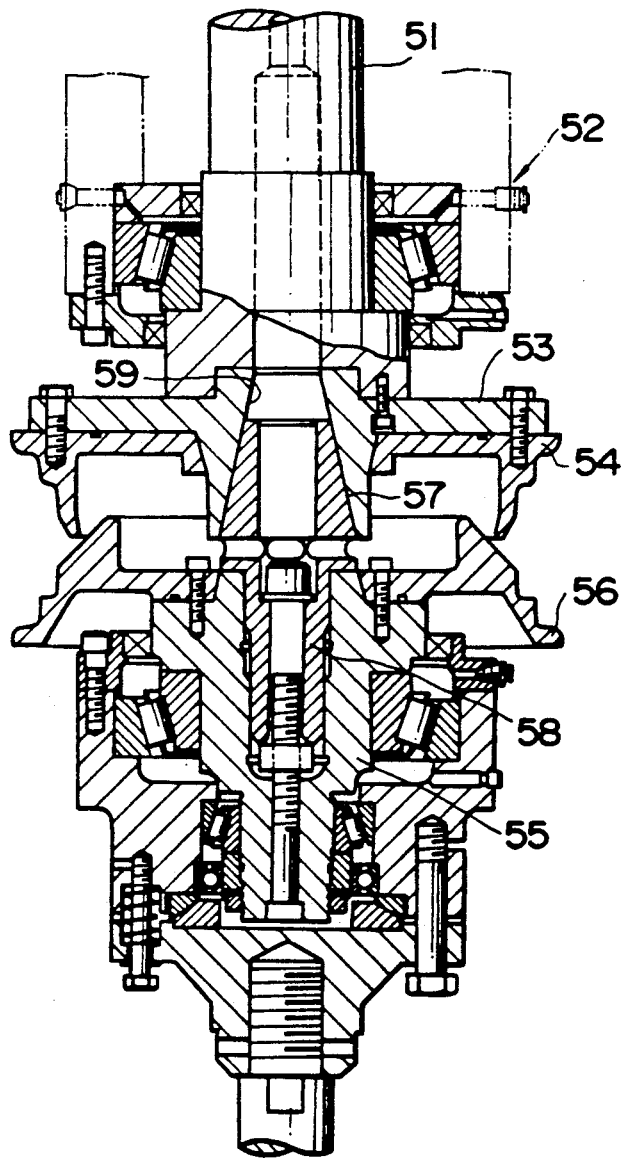
FIG. 9 is a vertical sectional view through the center of the machine of FIG. 8.
Figure 7:
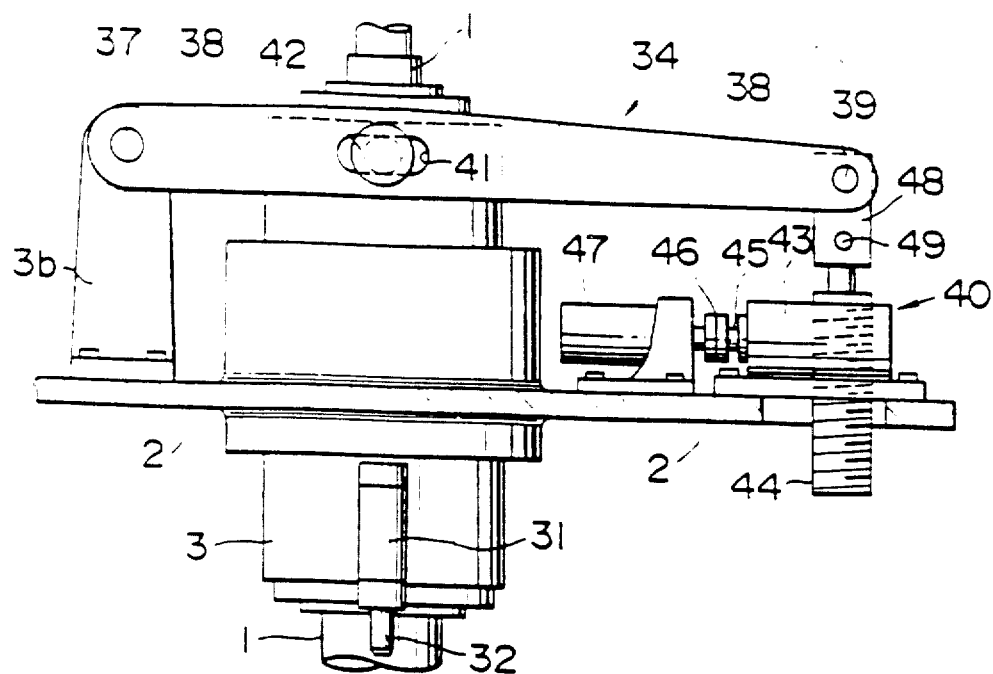
FIG. 7 is a side view of a bearing housing drive and lock means.

Referring to FIGS. 6 and 7, there is shown a second embodiment of the invention, which is same as the foregoing first embodiment except that the bearing housing 3 of the upper spindle 1 is mounted on the machine frame 2 movably in the vertical direction and in association with a bearing housing drive and lock means 34. Therefore, the component parts which are common with the first embodiment are designated by common reference numerals, without going into a detailed description in this regard to avoid unnecessary repetitions.

The bearing housing 3 is in the form of a tubular sleeve, and axially slidably fitted in a retainer sleeve 35 which is formed vertically in the machine frame 2. The bearing housing drive and lock means 34 is constituted by a U-shaped bracket 36 erected on the machine frame 2, paired drive levers 38 each having one end thereof pivotally connected to an upper end of the bracket 36 through a pin 37, and a screw jack 40 connected to the other ends of the drive levers 38 through a pin 39. Each drive lever 38 is provided with an elongated slot 41 longitudinally in an intermediate portion, receiving therein a pin 42 which is fixed to an upper end portion of the bearing housing 3. Namely, the drive levers 38 are connected to the bearing housing 3 through the pin 42.

The screw jack 40 includes a rotary nut (not shown) which is rotatably received in a jack casing 43 and provided with a worm gear on the circumference thereof, a screw rod 44 which is meshed with the rotary nut, a rotational shaft 45 which is provided with a worm (not shown) at the fore end thereof in meshing engagement with the aforementioned worm gear, and a motor 47 which is connected with the rotational shaft 45 through a coupling 46. The upper end of the screw rod 44 is connected through a pin 49 to an intermediate link 48 which is connected to the afore-mentioned levers 38 through the pin 39. As the screw rod 44 is moved up and down, the other ends of the drive levers 38 are rocked up and down about the pin 37 to permit axial displacement of the bearing housing 3. The screw jack 40 is held in a locked state when the screw rod 44 is at rest, so that it has a function of locking the bearing housing 3 in addition to the driving function.

In this second embodiment, when the widthwise center line CL of the tire T (the intermediate line between the upper and lower rims 16 and 33) is deviated from the widthwise center line CW of the load wheel LW by alteration of the rim width W as shown in FIG. 6, the motor 47 of the screw jack 40 is actuated to move the other ends of the drive levers 38 upward or downward, shifting the bearing housing 3 in the upward or downward direction until the two center lines CL and CW come into alignment with each other. Accordingly, each tire can be examined accurately under constant conditions. More specifically, as shown in FIG. 6, firstly the adapter 17 is moved by a distance double the increment or decrement in rim width, and then the bearing housing 3 is displaced by a distance equal to the increment or decrement in rim width in a direction opposite to the direction of displacement of the adapter 17, thereby bringing the tire center line CL into alignment with the load wheel center CW.

Needless to say, the invention is not restricted to the particular forms shown in the foregoing embodiments. For example, the lock means 23 for the adapter 17 may employ a mechanical lock mechanism instead of the hydraulic one, and the drive and lock means 34 for the bearing housing 3 may be replaced by other mechanical or hydraulic lock mechanism if desired.

As clear from the foregoing description, the present invention provides an automatic rim width adjusting mechanism for tire uniformity machine, in which an upper rim 16 is mounted on the lower end of upper spindle 1 through a vertically movable adapter 17 under a bearing housing 3 which is provided with block means 31 for blocking rotation of the adapter 17 relative to the upper spindle 1 to permit stepless and automatic adjustment of the rim width W or the width of the interval between the upper and lower rims 16 and 33 according to the tire size. Therefore, it becomes obsolete to provide a large number of chuck adapters for various tire sizes as required by the conventional apparatus, permitting reductions in cost and obviating the troublesome management of a large number of inventory spare parts. Further, the apparatus of the invention contributes to the enhancement of inspection efficiency, reduction of inspection cost and saving of manpower by shortening the time of suspension of the tire uniformity machine operation.

The provision of the adapter lock means 23 makes it possible to maintain an accurate rim width between the upper and lower rims 16 and 33 through accurate positioning of the upper and lower rims 16 and 33 particularly with regard to their parallelism and perpendicularity to the center axis.

Furthermore, the bearing housing 3 is movable in the axial direction and associated with the drive and lock means 34 on the machine frame 2, so that each tire can be inspected under constant conditions with the widthwise center line CL of the tire in alignment with the widthwise center line CW of the load wheel LW.

What is claimed is:

1. An apparatus for automatically adjusting the rim width between upper and lower rims on a tire uniformity machine of the type including an upper spindle rotatable about the axis thereof, a lower spindle located opposingly in vertical alignment with said upper spindle, said lower spindle being rotatable about the axis thereof and movable in the axial direction, and upper and lower rims detachably mounted coaxially on opposing end portions of said upper and lower spindles, respectively, to releasably grip therebetween a testing tire to be rotated and held in contact with a load wheel for inspection of uniformity, wherein said rim width adjusting apparatus comprises:

a ring-like adapter threaded on a lower end portion of said upper spindle and vertically movable supporting said upper rim on said upper spindle;

a rotation blocking means mounted on a bearing housing over said adapter for blocking rotation of said adapter relative to said upper spindle; and means for selectively applying and releasing said rotation blocking means.

2. An automatic rim width adjusting apparatus as defined in claim 1, wherein said bearing housing is vertically movably mounted on a machine frame along with a bearing housing drive and lock means.

3. An automatic rim width adjusting apparatus as defined in claim 2, wherein said bearing housing drive and lock means includes a motor driven screw jack mounted on said machine frame and connected to said bearing housing through drive levers.

4. An automatic rim width adjusting apparatus as defined in one of claims 1 to 3, wherein said adapter is provided with an internal screw portion and a sliding wall portion in upper and lower portions on the inner periphery thereof.

5. An automatic rim width adjusting apparatus as defined in claim 4, wherein said adapter is provided with an adapter lock means for pressingly fixing said adapter to said upper spindle.

6. An automatic rim width adjusting apparatus as defined in claim 5, wherein said adapter lock means comprises a hydraulic piston-cylinder adapted to press part of said sliding wall portion fixedly against said upper spindle.

7. An automatic rim width adjusting apparatus as defined in claim 6, wherein said adapter lock means further comprises an air cylinder mounted on the circumference of said bearing hosing in association with a depressible unlocking member of said hydraulic piston-cylinder for applying and releasing the locking action thereof.

* * * * *

UNITED STATES PATENT AND TRADEMARK OFFICE
CERTIFICATE OF CORRECTION

PATENT NO. : 5,107,702
DATED : April 28, 1992
INVENTOR(S) : Atsuaki Iwama

Figure 8:
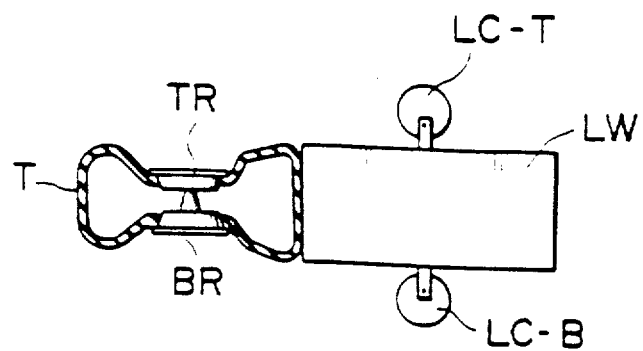
FIG. 8 is a schematic view of a conventional tire uniformity machine.

It is certified that error appears in the above-identified patent and that said Letters Patent is hereby corrected as shown below:

In the drawings, Sheet 5 of 6 consisting of Figure 6 (duplicate) should be deleted and therefor substitute the corrected Sheet 5 of 6, consisting of Figures 7 and 8, as shown on the attached page.

Signed and Sealed this

Seventeenth Day of May, 1994

Attest:

BRUCE LEHMAN

Attesting Officer     Commissioner of Patents and Trademarks